(12) United States Patent
Karasawa

(10) Patent No.: US 7,271,837 B2
(45) Date of Patent: Sep. 18, 2007

(54) METHOD AND APPARATUS FOR ACQUIRING LINE SIGNALS

(75) Inventor: Hiroyuki Karasawa, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 690 days.

(21) Appl. No.: 10/255,071

(22) Filed: Sep. 26, 2002

(65) Prior Publication Data

US 2003/0076434 A1   Apr. 24, 2003

(30) Foreign Application Priority Data

Sep. 27, 2001   (JP)   ............................. 2001-295749

(51) Int. Cl.
  *H04N 5/335*   (2006.01)
  *H04N 5/247*   (2006.01)

(52) U.S. Cl. ..................... 348/324; 348/264; 358/474

(58) Field of Classification Search .............. 348/264, 348/324; 358/482, 483, 474; 250/208.1
See application file for complete search history.

(56) References Cited

U.S. PATENT DOCUMENTS

| | | | | | |
|---|---|---|---|---|---|
| 4,147,928 | A | * | 4/1979 | Crean et al. ................. | 235/454 |
| 4,734,787 | A | * | 3/1988 | Hayashi ...................... | 358/409 |
| 5,091,978 | A | * | 2/1992 | Hirota ........................ | 382/323 |
| 5,153,929 | A | * | 10/1992 | Itagaki ........................ | 382/323 |
| 5,264,945 | A | * | 11/1993 | Kannegundla et al. ...... | 358/444 |
| 2001/0052582 | A1 | * | 12/2001 | Isoda ......................... | 250/584 |

* cited by examiner

*Primary Examiner*—Lin Ye
(74) *Attorney, Agent, or Firm*—Sughrue Mion, PLLC

(57) ABSTRACT

When signal charges are read from light receiving pixels of each of CCD sensors, which are arrayed linearly such that end regions of CCD sensors adjacent to each other overlap with respect to a direction intersecting with the linear array direction of the CCD sensors, binning processing of the signal charges is performed, such that a position of one unit of light receiving pixels, which are to be subjected together to the binning processing, at the end region of one of the CCD sensors adjacent to each other and a position of one unit of light receiving pixels, which are to be subjected together to the binning processing, at the end region of the other CCD sensor coincide with each other with respect to the linear array direction of the CCD sensors.

11 Claims, 4 Drawing Sheets

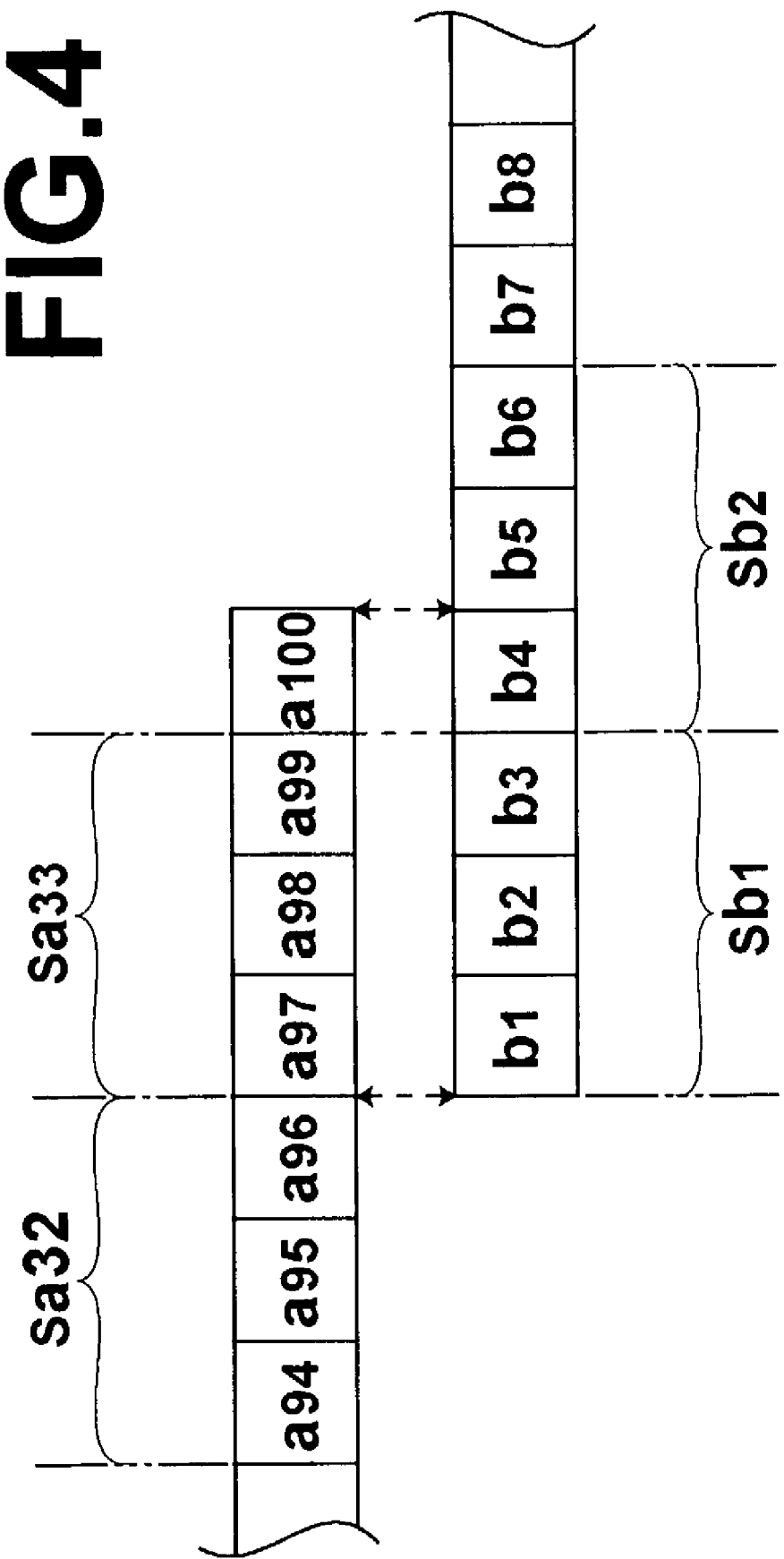

METHOD AND APPARATUS FOR ACQUIRING LINE SIGNALS

BACKGROUND OF THE INVENTION

1. Field of the Invention

This invention relates to a method and apparatus for acquiring a line signal. This invention particularly relates to a method and apparatus for acquiring a line signal, wherein the line signal is acquired by use of a plurality of charge coupled device sensors, which are arrayed linearly.

2. Description of the Related Art

There have heretofore been known image read-out apparatuses, wherein a line signal representing image information, which is carried along each line on an image storage sheet to be subjected to image readout, is acquired from the image storage sheet by use of a charge coupled device sensor (hereinbelow referred to as the CCD sensor), which comprises a plurality of light receiving pixels arrayed linearly. In the image read-out apparatuses for reading out the image information from the image storage sheet, it is necessary for the CCD sensor to have a length corresponding to a width of the image storage sheet. However, it is not always possible to make a long CCD sensor. Therefore, for example, a plurality of CCD sensors are arrayed linearly and located such that end regions of CCD sensors, which are adjacent to each other, overlap one upon the other with respect to a direction intersecting with the linear array direction of the CCD sensors. In this manner, a long CCD sensor unit comprising the plurality of the CCD sensors is formed. Light, which carries the image information along each line on the image storage sheet, is received by the long CCD sensor unit and subjected to photoelectric conversion with respect to each of light receiving pixels constituting the long CCD sensor unit. In this manner, a signal charge corresponding to each of the light receiving pixels constituting the long CCD sensor unit is obtained. The thus obtained signal charges corresponding respectively to the light receiving pixels are read, and the line signal is thereby acquired.

With respect to the end regions of the CCD sensors adjacent to each other, which end regions overlap one upon the other, an arithmetic mean calculation is made on a value (a signal component) obtained from the signal charge having been obtained from a certain light receiving pixel, which is located at the end region of one of the CCD sensors adjacent to each other, and a value (a signal component) obtained from the signal charge having been obtained from a light receiving pixel, which is located at the end region of the other CCD sensor and overlaps upon the aforesaid certain light receiving pixel of the one CCD sensor with respect to the direction intersecting with the linear array direction of the CCD sensors. The thus calculated arithmetic mean value is taken as the signal component of the line signal, which signal component represents the light information received at the end regions of the CCD sensors adjacent to each other.

The long CCD sensor unit described above is often employed for detection of radiation images in radiation image read-out apparatuses. With the radiation image read-out apparatuses utilizing the long CCD sensor unit, stimulating rays are irradiated to a stimulable phosphor sheet comprising a stimulable phosphor layer, on which a radiation image of an object, such as a human body, has been stored. The stimulating rays cause the stimulable phosphor sheet to emit light in proportion to the amount of energy stored thereon during its exposure to radiation. The light emitted by the stimulable phosphor sheet is received by the long CCD sensor unit and subjected to photoelectric conversion. Signal charges, which have been obtained from the photoelectric conversion of the emitted light, are read, and a line signal is thereby obtained. The thus obtained line signal is then processed and utilized for the reproduction of the radiation image of the object as a visible image on a recording material.

The light emitted by the stimulable phosphor sheet is weak. In order for the radiation image information of the object, which radiation image information is represented by the light emitted by the stimulable phosphor sheet, to be acquired with a high signal-to-noise ratio, it is desired that the signal charges, which have been obtained from the photoelectric conversion of the emitted light having been received by the long CCD sensor unit, be subjected to binning processing with respect to the linear array direction of the CCD sensors and thereby be read.

However, the plurality of the CCD sensors, which are arrayed linearly in the long CCD sensor unit, are located such that the end regions of the CCD sensors adjacent to each other overlap one upon the other with respect to the direction intersecting with the linear array direction of the CCD sensors. Therefore, there is the risk that, when the binning processing is performed on the signal charges having been transferred from the plurality of the light receiving pixels constituting the CCD sensors, the position of one unit of the light receiving pixels, from which one unit of the signal charges to be subjected together to the binning processing have been transferred, in one of the CCD sensors adjacent to each other and the position of one unit of the light receiving pixels, from which one unit of the signal charges to be subjected together to the binning processing have been transferred, in the other CCD sensor will shift from each other in the linear array direction of the CCD sensors. If the position of the one unit of the light receiving pixels, which are to be subjected together to the binning processing, in one of the CCD sensors adjacent to each other and the position of the one unit of the light receiving pixels, which are to be subjected together to the binning processing, in the other CCD sensor shift from each other in the linear array direction of the CCD sensors, there will be the risk that the phase determined by the sampling period represented by the intervals of the respective units of the light receiving pixels, which are to be subjected together to the binning processing, the intervals being taken along the linear array direction of the CCD sensors, will vary for the CCD sensors adjacent to each other. Also, in such cases, there will be the risk that, with respect to the end regions of the CCD sensors adjacent to each other, which end regions overlap one upon the other, the value (the signal component) obtained from the one unit of the signal charges, which have been obtained from the photoelectric conversion of the light received at a certain position with respect to the linear array direction of the CCD sensors, and the value (the signal component) obtained from the one unit of the signal charges, which have been obtained from the photoelectric conversion of the light received at a position different from the aforesaid certain position with respect to the linear array direction of the CCD sensors, will be subjected to the arithmetic mean calculation. As a result, a signal component, which accurately represents one unit of the image information, cannot be acquired. Accordingly, the problems occur in that a line signal carrying accurate position information cannot be acquired.

SUMMARY OF THE INVENTION

The primary object of the present invention is to provide a method of acquiring a line signal, wherein a line signal carrying accurate position information is capable of being acquired.

Another object of the present invention is to provide an apparatus for carrying out the method of acquiring a line signal.

The present invention provides a first method of acquiring a line signal, comprising the steps of:

i) receiving light with linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the received light being subjected to photoelectric conversion performed by the linear light receiving means, signal charges being obtained from the photoelectric conversion of the received light, and ii) reading the signal charges from the linear light receiving means through binning processing of the signal charges with respect to the linear array direction of the charge coupled device sensors, at least one line signal being thereby acquired, wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, the binning processing of the signal charges with respect to the linear array direction of the charge coupled device sensors is performed, the binning processing comprising a process for setting such that a position of one unit of light receiving pixels, which are to be subjected together to the binning processing, at the end region of one of the charge coupled device sensors adjacent to each other and a position of one unit of light receiving pixels, which are to be subjected together to the binning processing, at the end region of the other charge coupled device sensor coincide with each other with respect to the linear array direction of the charge coupled device sensors.

The present invention also provides a second method of acquiring a line signal, comprising the steps of:

i) receiving light with linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the received light being subjected to photoelectric conversion performed by the linear light receiving means, signal charges being obtained from the photoelectric conversion of the received light, and ii) reading the signal charges from the linear light receiving means through binning processing of the signal charges with respect to the linear array direction of the charge coupled device sensors, at least one line signal being thereby acquired, wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, at least either one of the charge coupled device sensors adjacent to each other is capable of being moved such that a position of one unit of light receiving pixels, which are to be subjected together to the binning processing, at the end region of one of the charge coupled device sensors adjacent to each other and a position of one unit of light receiving pixels, which are to be subjected together to the binning processing, at the end region of the other charge coupled device sensor coincide with each other with respect to the linear array direction of the charge coupled device sensors.

The present invention further provides an apparatus for carrying out the first method of acquiring a line signal in accordance with the present invention. Specifically, the present invention further provides a first apparatus for acquiring a line signal, comprising:

i) linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the linear light receiving means receiving light and performing photoelectric conversion of the received light in order to obtain signal charges, and ii) line signal acquiring means for reading the signal charges from the linear light receiving means through binning processing of the signal charges with respect to the linear array direction of the charge coupled device sensors in order to acquire at least one line signal, wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, the line signal acquiring means performs the binning processing of the signal charges with respect to the linear array direction of the charge coupled device sensors, the binning processing comprising a process for setting such that a position of one unit of light receiving pixels, which are to be subjected together to the binning processing, at the end region of one of the charge coupled device sensors adjacent to each other and a position of one unit of light receiving pixels, which are to be subjected together to the binning processing, at the end region of the other charge coupled device sensor coincide with each other with respect to the linear array direction of the charge coupled device sensors.

The present invention still further provides an apparatus for carrying out the second method of acquiring a line signal in accordance with the present invention. Specifically, the present invention still further provides a second apparatus for acquiring a line signal, comprising:

i) linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the linear light receiving means receiving light and performing photoelectric conversion of the received light in order to obtain signal charges, and ii) line signal acquiring means for reading the signal charges from the linear light receiving means through binning processing of the signal charges with respect to the linear array direction of the charge coupled device sensors in order to acquire at least one line signal, wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, at least either one of the charge coupled device sensors adjacent to each other is capable of being moved such that a position of one unit of light receiving pixels, which are to be subjected together to the binning processing, at the end region of one of the charge coupled device sensors adjacent to each other and a position of one unit of light receiving pixels, which are to be subjected together to the binning processing, at the end region of the other charge coupled device sensor coincide with each other with respect to the linear array direction of the charge coupled device sensors.

In the first method and apparatus for acquiring a line signal in accordance with the present invention and in the second method and apparatus for acquiring a line signal in accordance with the present invention, each of the CCD sensors of the linear light receiving means may be constituted of the plurality of the light receiving pixels, which are arrayed in, for example, one row, two rows, or three rows along the linear array direction of the CCD sensors. In cases where each of the CCD sensors of the linear light receiving means is constituted of the plurality of the light receiving pixels, which are arrayed in at least two rows along the linear array direction of the CCD sensors, a set of light receiving pixels, which are located in two-dimensional directions, i.e. in both the linear array direction of the CCD sensors and the direction in which the at least two light receiving pixel rows stand side by side, may be taken as the one unit of the light receiving pixels, which are to be subjected together to the binning processing with respect to the linear array direction of the CCD sensors.

Also, in the first method and apparatus for acquiring a line signal in accordance with the present invention and in the second method and apparatus for acquiring a line signal in accordance with the present invention, the light received with the linear light receiving means may be light emitted by a stimulable phosphor sheet, on which a radiation image has been stored, when the stimulable phosphor sheet is exposed to stimulating rays, which cause the stimulable phosphor sheet to emit the light in proportion to an amount of energy stored thereon during its exposure to radiation.

With the first method and apparatus for acquiring a line signal in accordance with the present invention, at the time of the reading of the signal charges, which have been obtained from the photoelectric conversion of the light received with the linear light receiving means, from the linear light receiving means through the binning processing of the signal charges with respect to the linear array direction of the CCD sensors, the binning processing of the signal charges with respect to the linear array direction of the CCD sensors is performed, the binning processing comprising the process for setting such that the position of the one unit of the light receiving pixels, which are to be subjected together to the binning processing, at the end region of one of the CCD sensors adjacent to each other and the position of the one unit of light receiving pixels, which are to be subjected together to the binning processing, at the end region of the other CCD sensor coincide with each other with respect to the linear array direction of the CCD sensors. Therefore, the phase determined by the sampling period represented by the intervals of the respective units of the light receiving pixels, which are to be subjected together to the binning processing, the intervals being taken along the linear array direction of the CCD sensors, is capable of being set to coincide over the plurality of the CCD sensors. Accordingly, in cases where the signal charges, which have been obtained from the photoelectric conversion of the light received with the plurality of the CCD sensors, are read through the binning processing, in which the positions of the respective units of the light receiving pixels are set in the manner described above, a line signal carrying accurate position information is capable of being acquired.

With the second method and apparatus for acquiring a line signal in accordance with the present invention, at the time of the reading of the signal charges, which have been obtained from the photoelectric conversion of the light received with the linear light receiving means, from the linear light receiving means through the binning processing of the signal charges with respect to the linear array direction of the CCD sensors, at least either one of the CCD sensors adjacent to each other is capable of being moved such that the position of the one unit of the light receiving pixels, which are to be subjected together to the binning processing, at the end region of one of the CCD sensors adjacent to each other and the position of the one unit of the light receiving pixels, which are to be subjected together to the binning processing, at the end region of the other CCD sensor coincide with each other with respect to the linear array direction of the CCD sensors. Therefore, through the movement of at least either one of the CCD sensors adjacent to each other, the position of the one unit of the light receiving pixels, which are to be subjected together to the binning processing, at the end region of one of the CCD sensors adjacent to each other and the position of the one unit of the light receiving pixels, which are to be subjected together to the binning processing, at the end region of the other CCD sensor are capable of being set to coincide with each other with respect to the linear array direction of the CCD sensors. Accordingly, particular electric control need not be performed, and the phase determined by the sampling period represented by the intervals of the respective units of the light receiving pixels, which are to be subjected together to the binning processing, the intervals being taken along the linear array direction of the CCD sensors, is capable being set to coincide over the plurality of the CCD sensors. As a result, in cases where the positions of the respective units of the light receiving pixels in the plurality of the CCD sensors are set in the manner described above, and the signal charges, which have been obtained from the photoelectric conversion of the light received with the plurality of the CCD sensors, are read through the binning processing of the signal charges with respect to the linear array direction of the CCD sensors, a line signal carrying accurate position information is capable of being acquired.

BRIEF DESCRIPTION OF THE DRAWINGS

FIG. 4 is an enlarged view showing end regions of CCD sensors adjacent to each other in the second embodiment of the line signal acquiring apparatus in accordance with the present invention.

DESCRIPTION OF THE PREFERRED EMBODIMENTS

The present invention will hereinbelow be described in further detail with reference to the accompanying drawings.

Figure 1:
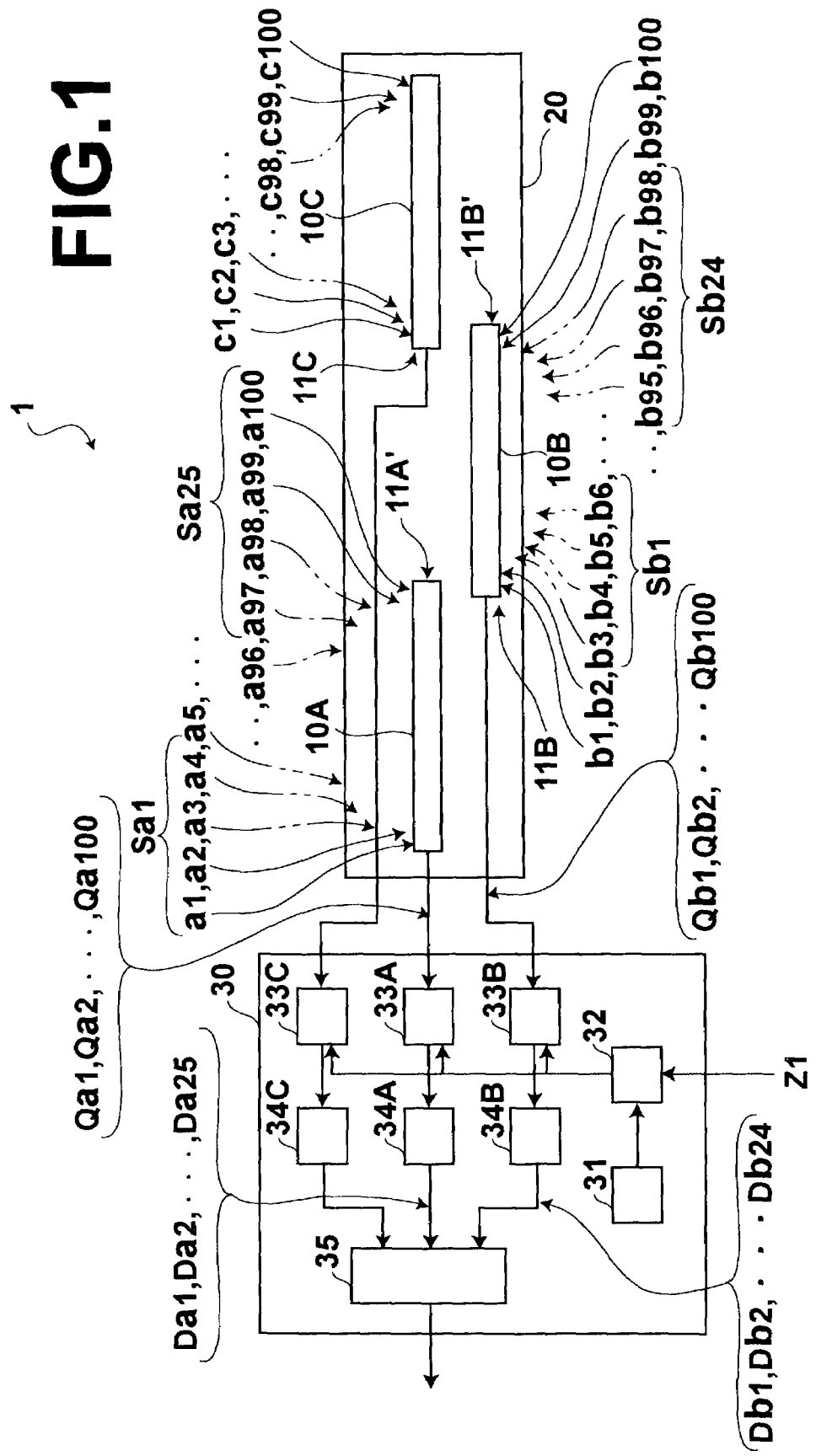
FIG. 1 is a block diagram showing a first embodiment of the line signal acquiring apparatus in accordance with the present invention.
Figure 2:
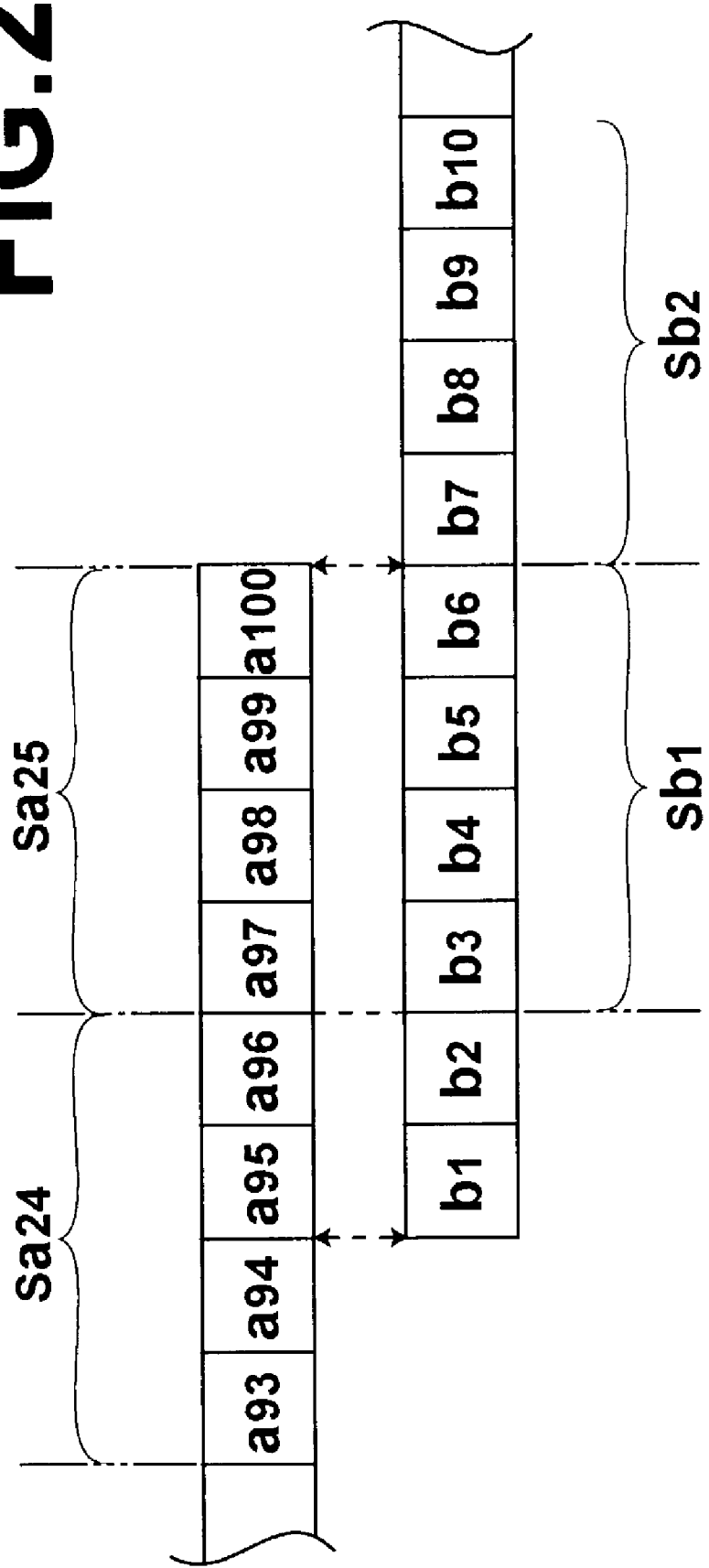
FIG. 2 is an enlarged view showing end regions of CCD sensors adjacent to each other in the first embodiment of the line signal acquiring apparatus in accordance with the present invention.

FIG. 1 is a block diagram showing a first embodiment of the line signal acquiring apparatus in accordance with the present invention. FIG. 2 is an enlarged view showing end regions of CCD sensors adjacent to each other in the first embodiment of the line signal acquiring apparatus in accordance with the present invention.

A line signal acquiring apparatus 1, which constitutes the first embodiment of the line signal acquiring apparatus in accordance with the present invention, comprises a long CCD sensor unit 20 and line signal acquiring means 30. The long CCD sensor unit 20 acts as linear light receiving means and comprises three CCD sensors 10A, 10B, and 10C. The CCD sensors 10A, 10B, and 10C are arrayed linearly and located such that an end region 11A' of the CCD sensor 10A and an end region 11B of the CCD sensor 10B, which is adjacent to the CCD sensor 10A, overlap one upon the other with respect to a direction intersecting with the linear array direction of the CCD sensors 10A, 10B, and 10C, and such that an end region 11B' of the CCD sensor 10B and an end region 11C of the CCD sensor 10C, which is adjacent to the CCD sensor 10B, overlap one upon the other with respect to the direction intersecting with the linear array direction of the CCD sensors 10A, 10B, and 10C. The long CCD sensor unit 20 receives light and performs photoelectric conversion of the received light in order to obtain signal charges. The line signal acquiring means 30 reads the signal charges from the long CCD sensor unit 20 through binning processing of the signal charges with respect to the linear array direction of the CCD sensors in order to acquire at least one line signal.

At the time of the reading of the signal charges from a plurality of light receiving pixels, which constitute each of the three CCD sensors 10A, 10B, and 10C of the long CCD sensor unit 20, through the binning processing of the signal charges with respect to the linear array direction of the CCD sensors 10A, 10B, and 10C, the line signal acquiring means 30 performs the binning processing of the signal charges with respect to the linear array direction of the CCD sensors 10A, 10B, and 10C, the binning processing comprising a process for setting such that the position of one unit of light receiving pixels, which are to be subjected together to the binning processing, at the end region 11A' of the CCD sensor 10A and the position of one unit of light receiving pixels, which are to be subjected together to the binning processing, at the end region 11B of the CCD sensor 10B, which is adjacent to the CCD sensor 10A, coincide with each other with respect to the linear array direction of the CCD sensors 10A, 10B, and 10C, and such that the position of one unit of light receiving pixels, which are to be subjected together to the binning processing, at the end region 11B' of the CCD sensor 10B and the position of one unit of light receiving pixels, which are to be subjected together to the binning processing, at the end region 11C of the CCD sensor 10C, which is adjacent to the CCD sensor 10B, coincide with each other with respect to the linear array direction of the CCD sensors 10A, 10B, and 10C. The line signal acquiring means 30 comprises a light receiving pixel location memory 31, a binning start pixel operation device 32, binning registers 33A, 33B, and 33C, digital signal output circuits 34A, 34B, and 34C, and a line signal composing device 35.

The light receiving pixel location memory 31 stores information representing the total number of the light receiving pixels of each of the CCD sensors 10A, 10B, and 10C. The light receiving pixel location memory 31 also stores information representing the number of the overlapping light receiving pixels at the end region 11A' of the CCD sensor 10A and the number of the overlapping light receiving pixels at the end region 11B of the CCD sensor 10B which is adjacent to the CCD sensor 10A, the overlapping light receiving pixels of the CCD sensor 10A and the overlapping light receiving pixels of the CCD sensor 10B overlapping one upon the other with respect to the direction intersecting with the linear array direction of the CCD sensors 10A, 10B, and 10C. The light receiving pixel location memory 31 further store information representing the number of the overlapping light receiving pixels at the end region 11B' of the CCD sensor 10B and the number of the overlapping light receiving pixels at the end region 11C of the CCD sensor 10C which is adjacent to the CCD sensor 10B, the overlapping light receiving pixels of the CCD sensor 10B and the overlapping light receiving pixels of the CCD sensor 10C overlapping one upon the other with respect to the direction intersecting with the linear array direction of the CCD sensors 10A, 10B, and 10C. In this embodiment, the total number of the light receiving pixels of the CCD sensor 10A, the total number of the light receiving pixels of the CCD sensor 10B, and the total number of the light receiving pixels of the CCD sensor 10C are identical with one another and are equal to 100 pixels. Also, the number of the overlapping light receiving pixels, which overlap one upon the other at the end region 11A' of the CCD sensor 10A and the end region 11B of the CCD sensor 10B, and the number of the overlapping light receiving pixels, which overlap one upon the other at the end region 11B' of the CCD sensor 10B and the end region 11C of the CCD sensor 10C, are identical with each other and are equal to 6 pixels.

The binning start pixel operation device 32 receives information, which represents the number of the binning pixels, from the exterior. The binning start pixel operation device 32 also receives the information, which represents the total number of the light receiving pixels of each of the CCD sensors 10A, 10B, and 10C, and the information, which represents the number of the overlapping light receiving pixels at each of the overlapping regions, from the light receiving pixel location memory 31. In accordance with the received information, the binning start pixel operation device 32 performs an operation for determining a binning start pixel, with which the binning processing is to be started, in the CCD sensor 10B (i.e., at the end region 11B), such that the position of a binning pixel block constituting the one unit of the light receiving pixels, which are to be subjected together to the binning processing, at the end region 11A' of the CCD sensor 10A and the position of a binning pixel block at the end region 11B of the CCD sensor 10B, which is adjacent to the CCD sensor 10A, coincide with each other with respect to the linear array direction of the CCD sensors 10A, 10B, and 10C. Also, the binning start pixel operation device 32 performs an operation for determining a binning start pixel in the CCD sensor 10C (i.e., at the end region 11C), such that the position of a binning pixel block at the end region 11B' of the CCD sensor 10B and the position of a binning pixel block at the end region 11C of the CCD sensor 10C, which is adjacent to the CCD sensor 10B, coincide with each other with respect to the linear array direction of the CCD sensors 10A, 10B, and 10C.

The binning registers 33A, 33B, and 33C receive the information representing the number of the binning pixels and the information representing the binning start pixels from the binning start pixel operation device 32. In accordance with the received information, the binning register 33A performs the binning processing on the signal charges transferred from the light receiving pixels of the corresponding CCD sensor 10A, which light receiving pixels constitute each of the binning pixel blocks. Also, the binning register 33B performs the binning processing on the signal charges transferred from the light receiving pixels of the corresponding CCD sensor 10B, which light receiving pixels constitute each of the binning pixel blocks. Further, the binning register 33C performs the binning processing on the signal charges transferred from the light receiving pixels of the corresponding CCD sensor 10C, which light receiving pixels constitute each of the binning pixel blocks. In this manner, each unit of the signal charges are outputted together from each of the binning registers 33A, 33B, and 33C.

The digital signal output circuit 34A converts each unit of the signal charges, which have been received from the binning register 33A, into a voltage, performs analog-to-digital conversion on the voltage, and outputs a digital signal component having a value corresponding to each unit of the signal charges. Also, the digital signal output circuit 34B converts each unit of the signal charges, which have been received from the binning register 33B, into a voltage, performs analog-to-digital conversion on the voltage, and outputs a digital signal component having a value corresponding to each unit of the signal charges. Further, the digital signal output circuit 34C converts each unit of the signal charges, which have been received from the binning register 33C, into a voltage, performs analog-to-digital conversion on the voltage, and outputs a digital signal component having a value corresponding to each unit of the signal charges.

The line signal composing device 35 combines the digital signal components, which are received from the digital signal output circuits 34A, 34B, and 34C, and forms a line signal, which represents the received light information along the linear array direction of the three CCD sensors 10A, 10B, and 10C.

The CCD sensor 10A comprises light receiving pixels $a1$, $a2$, $a3$, ..., $a100$, which are arrayed in this order and in a row along the linear array direction of the three CCD sensors 10A, 10B, and 10C. Through the photoelectric conversion, signal charges $Qa1$, $Qa2$, $Qa3$, ..., $Qa100$ are obtained respectively from the light receiving pixels $a1$, $a2$, $a3$, ..., $a100$. The order, in which the signal charges $Qa1$, $Qa2$, $Qa3$, ..., $Qa100$ are transferred into the binning register 33A, is identical with the order, in which the light receiving pixels $a1$, $a2$, $a3$, $a100$ are arrayed. Therefore, the signal charges $Qa1$, $Qa2$, $Qa3$, ..., $Qa100$ are transferred in this order into the binning register 33A.

Also, the CCD sensor 10B comprises light receiving pixels $b1$, $b2$, $b3$, ..., $b100$, which are arrayed in this order and in a row along the linear array direction of the three CCD sensors 10A, 10B, and 10C. Through the photoelectric conversion, signal charges $Qb1$, $Qb2$, $Qb3$, ..., $Qb100$ are obtained respectively from the light receiving pixels $b1$, $b2$, $b3$, ..., $b100$. The order, in which the signal charges $Qb1$, $Qb2$, $Qb3$, ..., $Qb100$ are transferred into the binning register 33B, is identical with the order, in which the light receiving pixels $b1$, $b2$, $b3$, ..., $b100$ are arrayed. Therefore, the signal charges $Qb1$, $Qb2$, $Qb3$, ..., $Qb100$ are transferred in this order into the binning register 33B.

Further, the CCD sensor 10C comprises light receiving pixels $c1$, $c2$, $c3$, ..., $c100$, which are arrayed in this order and in a row along the linear array direction of the three CCD sensors 10A, 10B, and 10C. In the same manner as that described above, signal charges obtained respectively from the light receiving pixels $c1$, $c2$, $c3$, ..., $c100$ are transferred in the order, in which the light receiving pixels $c1$, $c2$, $c3$, ..., $c100$ are arrayed, into the binning register 33C.

By way of example, the signal charges are read from the long CCD sensor unit 20 through the binning processing, in which four pixels are taken as one unit, and the line signal is thereby acquired. In such cases, the line signal acquiring apparatus 1 operates in the manner described below.

How the signal charges are read from the CCD sensor 10A and the CCD sensor 10B, which are adjacent to each other, will primarily be described hereinbelow. The reading of the signal charges from the CCD sensor 10C is performed in the same manner as that for the CCD sensor 10B, and will therefore be described briefly.

Specifically, a signal Z1 for giving an instruction for performing the binning processing, in which the four pixels are taken as one unit, is fed into the binning start pixel operation device 32. In accordance with the signal Z1, the binning start pixel operation device 32 reads the information, which represents the total number of the light receiving pixels (in this case, 100 pixels) of each of the CCD sensors 10A and 10B, and the information, which represents the number of the overlapping light receiving pixels (in this case, 6 pixels) at the end region 11A' of the CCD sensor 10A and the end region 11B of the CCD sensor 10B, from the light receiving pixel location memory 31. In accordance with the received information, the binning start pixel operation device 32 performs the operation for determining a binning start pixel, i.e. the light receiving pixel yielding the signal charge, which is to be transferred firstly for the binning processing, among the light receiving pixels of the CCD sensor 10B.

More specifically, in cases where the one unit of the binning processing is constituted of the four pixels, a first binning pixel block $Sa1$ in the CCD sensor 10A is constituted of the light receiving pixels $a1$, $a2$, $a3$, and $a4$. Also, a last binning pixel block $Sa25$ in the CCD sensor 10A is constituted of the light receiving pixels $a97$, $a98$, $a99$, and $a100$. Therefore, as illustrated in FIG. 2, it is found that the third light receiving pixel $a97$, which is among the six overlapping light receiving pixels $a95$, $a96$, $a97$, $a98$, $a99$, and $a100$ at the end region 11A' of the CCD sensor 10A, is the pixel, which yields the first signal charge to be transferred into the binning register 33A, in the binning pixel block $Sa25$. Also, such that the phase, which is determined by the sampling period represented by the intervals of the respective binning pixel blocks of the CCD sensor 10A, the intervals being taken along the linear array direction of the CCD sensors 10A, 10B, and 10C, and the phase, which is determined by the sampling period represented by the intervals of the respective binning pixel blocks of the CCD sensor 10B, may coincide with each other, the first light receiving pixel of the binning pixel block in the CCD sensor 10B may be located at the position, which coincides with the position of the light receiving pixel $a97$ of the binning pixel block $Sa25$ of the CCD sensor 10A with respect to the linear array direction of the CCD sensors 1A, 10B, and 10C. Therefore, among the six overlapping light receiving pixels $b1$, $b2$, $b3$, $b4$, $b5$, and $b6$ at the end region 11B of the CCD sensor 10B, the light receiving pixel $b3$, whose position coincides with the position of the light receiving pixel $a97$ of the binning pixel block $Sa25$ of the CCD sensor 10A with respect to the linear array direction of the CCD sensors 10A, 10B, and 10C, is determined as the binning start pixel.

In accordance with the results of the operation described above, an instruction, which indicates that the light receiving pixel b3 is to be taken as the binning start pixel in the CCD sensor 10B, is fed from the binning start pixel operation device 32 into the binning register 33B. As a result, a binning pixel block Sb1, which is to be firstly subjected to the binning processing among the binning pixel blocks of the CCD sensor 10B, is constituted of the light receiving pixels b3, b4, b5, and b6.

After the setting of the binning start pixel described above has been finished, the signal charges, which have been obtained from the photoelectric conversion of the light received with the long CCD sensor unit 20, are read by the line signal acquiring means 30.

From the CCD sensor 10A, firstly, the signal charges Qa1, Qa2, Qa3, and Qa4, which have been obtained from the photoelectric conversion of the light received with the light receiving pixels a1, a2, a3, and a4 of the binning pixel block Sa1, are transferred into the binning register 33A and subjected to the binning processing. From the binning processing performed on the signal charges Qa1, Qa2, Qa3, and Qa4, a digital signal component Da1 is formed by the digital signal output circuit 34A. Thereafter, the signal charges, which have been transferred from the light receiving pixels of the binning pixel block Sa2, the signal charges, which have been transferred from the light receiving pixels of the binning pixel block Sa3, and so on, are transferred successively into the binning register 33A and subjected to the binning processing. From the binning processing performed on the signal charges, digital signal components Da2, Da3, Da4, . . . are formed by the digital signal output circuit 34A. Lastly, a digital signal component Da25 corresponding to the binning pixel block Sa25 is formed by the digital signal output circuit 34A.

As for the CCD sensor 10B, the signal charges Qb1 and Qb2, which have been transferred from the light receiving pixels b1 and b2, are temporarily fed into the binning register 33B and are then erased by the resetting of the binning register 33B. Thereafter, the binning processing is begun with the signal charge, which has been obtained from the photoelectric conversion of the light received with the light receiving pixel b3 having been determined as the binning start pixel. Also, the signal charges Qb3, Qb4, Qb5, and Qb6, which have been obtained from the photoelectric conversion of the light received with the light receiving pixels b3, b4, b5, and b6 of the binning pixel block Sb1, are transferred into the binning register 33B and subjected to the binning processing. From the binning processing performed on the signal charges Qb3, Qb4, Qb5, and Qb6, a digital signal component Db1 is formed by the digital signal output circuit 34B.

Thereafter, the signal charges, which have been transferred from the light receiving pixels of the binning pixel block Sb2, the signal charges, which have been transferred from the light receiving pixels of the binning pixel block Sb3, and so on, are transferred successively into the binning register 33B and subjected to the binning processing. From the binning processing performed on the signal charges, digital signal components Db2, Db3, Db4, . . . are formed by the digital signal output circuit 34B. Lastly, a digital signal component Db24 corresponding to the binning pixel block Sb24, which is constituted of the light receiving pixels b95, b96, b97, and b98, is formed by the digital signal output circuit 34B. Thereafter, the signal charges Qb99 and Qb100, which have been transferred from the light receiving pixels b99 and b100, are temporarily fed into the binning register 33B and are then erased by the resetting of the binning register 33B.

Thereafter, the digital signal components Da1, Da2, Da3, . . . , Da25, which have been obtained from the digital signal output circuit 34A, and the digital signal components Db1, Db2, Db3, . . . , Db24, which have been obtained from the digital signal output circuit 34B, are fed into the line signal composing device 35. The values of the digital signal components Da1, Da2, Da3, . . . , Da24 are stored in an output buffer of the line signal composing device 35. The digital signal component Da25 and the digital signal component Db1 are subjected to an arithmetic mean calculation, and the thus calculated arithmetic mean value is taken as the value of the digital signal component in lieu of the values of the digital signal component Da25 and the digital signal component Db1. The digital signal component obtained from the arithmetic mean calculation is stored in the output buffer of the line signal composing device 35. Further, the values of the digital signal components Db2, Db3, . . . , Db23 are stored in the output buffer of the line signal composing device 35.

As for the CCD sensor 10C, a binning start pixel is determined in the same manner as that described above. Also, signal charges having been transferred from the CCD sensor 10C are subjected to the binning processing in the binning register 33C. In this manner, digital signal components Dc1, Dc2, Dc3, . . . are obtained from the digital signal output circuit 34C. The digital signal components Dc1, Dc2, Dc3, . . . are fed into the line signal composing device 35. In the line signal composing device 35, the digital signal component Db24 and the digital signal component Dc1 are subjected to the arithmetic mean calculation, and the thus calculated arithmetic mean value is taken as the value of the digital signal component in lieu of the values of the digital signal component Db24 and the digital signal component Dc1. The digital signal component obtained from the arithmetic mean calculation is stored in the output buffer of the line signal composing device 35. Further, the values of the digital signal components Dc2, Dc3, . . . , Dc24 are stored in the output buffer of the line signal composing device 35.

In the manner described above, the digital signal components Da1, Da2, Da3, . . . , Da24, the digital signal component having been obtained from the arithmetic mean calculation made on the digital signal component Da25 and the digital signal component Db1, the digital signal components Db2, Db3, . . . , Db23, the digital signal component having been obtained from the arithmetic mean calculation made on the digital signal component Db24 and the digital signal component Dc1, and the digital signal components Dc2, Dc3, . . . , Dc24 are stored in the output buffer of the line signal composing device 35. The thus stored digital signal components are fed out as a series of the signal components constituting the line signal, which represents the linear received light information along the three CCD sensors 10A, 10B, and 10C, from the line signal composing device 35.

Figure 3:
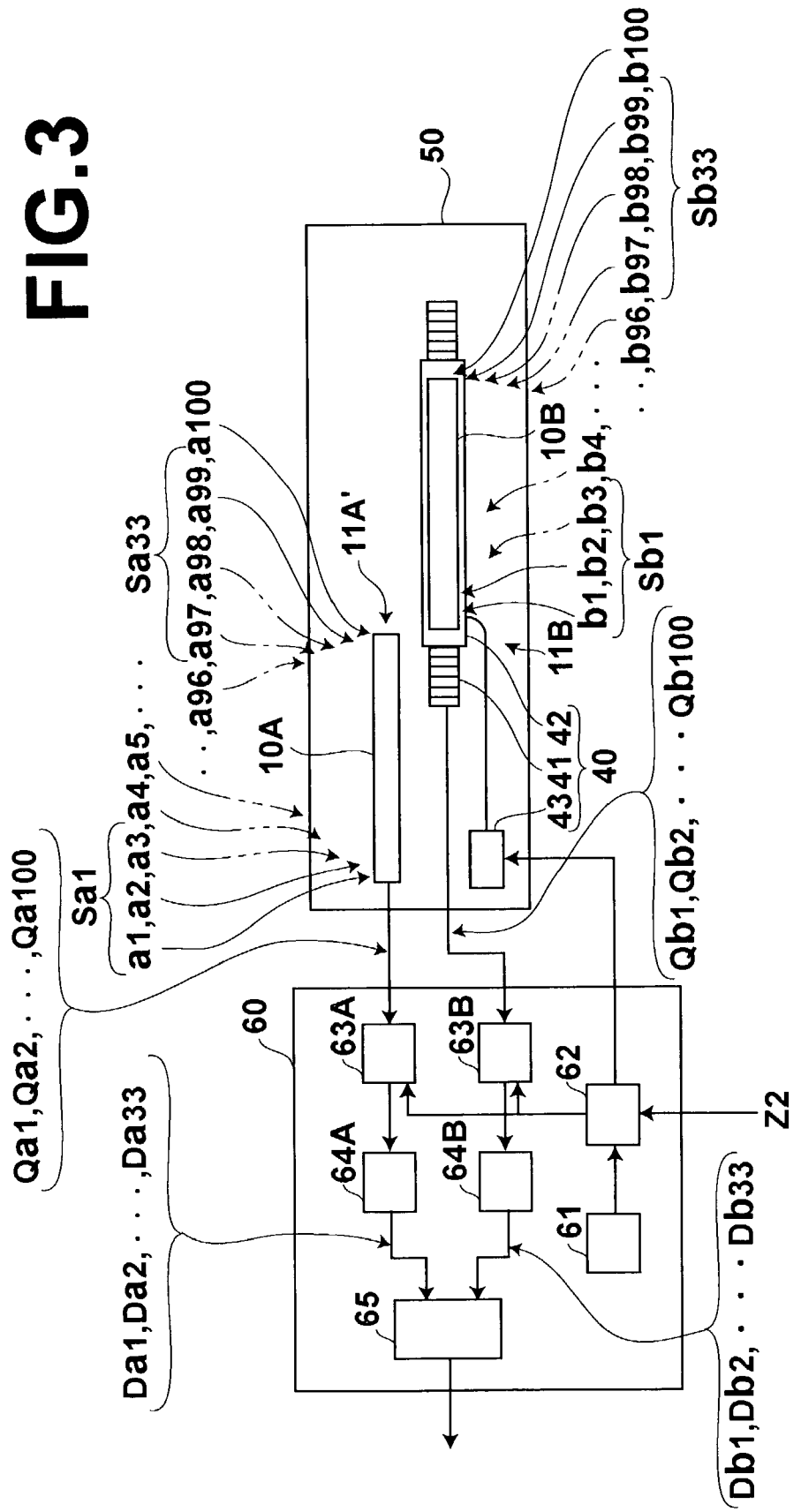
FIG. 3 is a block diagram showing a second embodiment of the line signal acquiring apparatus in accordance with the present invention.

A second embodiment of the line signal acquiring apparatus in accordance with the present invention will be described hereinbelow. FIG. 3 is a block diagram showing a second embodiment of the line signal acquiring apparatus in accordance with the present invention. FIG. 4 is an enlarged view showing end regions of CCD sensors adjacent to each other in the second embodiment of the line signal acquiring apparatus in accordance with the present invention.

A line signal acquiring apparatus 100, which constitutes the second embodiment of the line signal acquiring apparatus in accordance with the present invention, comprises a long CCD sensor unit 50 and line signal acquiring means 60. The long CCD sensor unit 50 acts as the linear light receiving means and comprises the two CCD sensors 10A and 10B. The CCD sensors 10A and 10B are arrayed linearly and located such that the end region 11A' of the CCD sensor 10A and the end region 11B of the CCD sensor 10B, which is adjacent to the CCD sensor 10A, overlap one upon the other with respect to the direction intersecting with the linear array direction of the CCD sensors 10A and 10B. The long CCD sensor unit 50 receives light and performs photoelectric conversion of the received light in order to obtain signal charges. The line signal acquiring means 60 reads the signal charges from the long CCD sensor unit 50 through binning processing of the signal charges with respect to the linear array direction of the CCD sensors in order to acquire at least one line signal.

The line signal acquiring apparatus 100 is constituted such that, at the time of the reading of the signal charges from the plurality of the light receiving pixels, which constitute each of the two CCD sensors 10A and 10B, through the binning processing of the signal charges with respect to the linear array direction of the CCD sensors 10A and 10B, at least either one of the CCD sensors 10A and 10B adjacent to each other (in this case, the CCD sensor 10B) is capable of being moved such that the position of one unit of light receiving pixels, which are to be subjected together to the binning processing, at the end region 11A' of the CCD sensor 10A and the position of one unit of light receiving pixels, which are to be subjected together to the binning processing, at the end region 11B of the CCD sensor 10B coincide with each other with respect to the linear array direction of the CCD sensors 10A and 10B.

The long CCD sensor unit 50 is provided with sensor moving means 40 for moving the CCD sensor 10B in the linear array direction of the CCD sensors 10A and 10B. The sensor moving means 40 moves the CCD sensor 10B in the linear array direction of the CCD sensors 10A and 10B by use of a linear motor mechanism comprising a combination of a linear motor rail and a linear motor movable section. The sensor moving means 40 comprises a linear motor rail 41, a linear motor movable section 42, and a controller 43. The linear motor movable section 42 is combined with the linear motor rail 41 and is capable of being moved in the linear array direction of the CCD sensors 10A and 10B. The CCD sensor 10B is located on a top surface of the linear motor movable section 42. The controller 43 supplies electric power to the linear motor rail 41 and the linear motor movable section 42 and performs control of the movement of the linear motor movable section 42.

The line signal acquiring means 60 comprises a light receiving pixel location memory 61, a binning start position operation device 62, binning registers 63A and 63B, digital signal output circuits 64A and 64B, and a line signal composing device 65.

The light receiving pixel location memory 61 stores information representing the total number of the light receiving pixels of each of the CCD sensors 10A and 10B. In this embodiment, the total number of the light receiving pixels of the CCD sensor 10A and the total number of the light receiving pixels of the CCD sensor 10B are identical with each other and are equal to 100 pixels.

The binning start position operation device 62 receives the information, which represents the number of the binning pixels, from the exterior. The binning start position operation device 62 also receives the information, which represents the total number of the light receiving pixels of each of the CCD sensors 10A and 10B, from the light receiving pixel location memory 61. In accordance with the received information, the binning start position operation device 62 performs an operation for determining a position of the CCD sensor 10B (i.e., the position of the end region 11B), specifically the position of the light receiving pixel which yields the signal charge to be transferred firstly from the CCD sensor 10B, with respect to the position light receiving pixels of the CCD sensor 10A, such that the position of a binning pixel block constituting the one unit of the light receiving pixels, which are to be subjected together to the binning processing, at the end region 11A' of the CCD sensor 10A and the position of a binning pixel block at the end region 11B of the CCD sensor 10B, which is adjacent to the CCD sensor 10A, coincide with each other with respect to the linear array direction of the CCD sensors 10A and 10B.

The binning registers 63A and 63B receive the information representing the number of the binning pixels from the binning start position operation device 62. In accordance with the received information, the binning register 63A performs the binning processing on the signal charges transferred from the light receiving pixels of the corresponding CCD sensor 10A, which light receiving pixels constitute each of the binning pixel blocks. Also, the binning register 63B performs the binning processing on the signal charges transferred from the light receiving pixels of the corresponding CCD sensor 10B, which light receiving pixels constitute each of the binning pixel blocks. In this manner, each unit of the signal charges are outputted together from each of the binning registers 63A and 63B.

The digital signal output circuit 64A converts each unit of the signal charges, which have been received from the binning register 63A, into a voltage, performs analog-to-digital conversion on the voltage, and outputs a digital signal component having a value corresponding to each unit of the signal charges. Also, the digital signal output circuit 64B converts each unit of the signal charges, which have been received from the binning register 63B, into a voltage, performs analog-to-digital conversion on the voltage, and outputs a digital signal component having a value corresponding to each unit of the signal charges.

The line signal composing device 65 combines the digital signal components, which are received from the digital signal output circuits 64A and 64B, and forms a line signal, which represents the received light information along the linear array direction of the two CCD sensors 10A and 10B.

The CCD sensor 10A comprises the light receiving pixels a1, a2, a3, . . . , a100, which are arrayed in this order and in a row along the linear array direction of the two CCD sensors 10A and 10B. Through the photoelectric conversion, the signal charges Qa1, Qa2, Qa3, . . . , Qa100 are obtained respectively from the light receiving pixels a1, a2, a3, . . . , a100. The order, in which the signal charges Qa1, Qa2, Qa3, . . . , Qa100 are transferred into the binning register 63A, is identical with the order, in which the light receiving pixels a1, a2, a3, . . . , a100 are arrayed. Therefore, the signal charges Qa1, Qa2, Qa3, . . . , Qa100 are transferred in this order into the binning register 63A.

Also, the CCD sensor 10B comprises the light receiving pixels b1, b2, b3, . . . , b100, which are arrayed in this order and in a row along the linear array direction of the two CCD sensors 10A and 10B. Through the photoelectric conversion, the signal charges Qb1, Qb2, Qb3, . . . , Qb100 are obtained respectively from the light receiving pixels b1, b2, b3, . . . , b100. The order, in which the signal charges Qb1, Qb2, Qb3, . . . , Qb100 are transferred into the binning register 63B, is identical with the order, in which the light receiving pixels b1, b2, b3, . . . , b100 are arrayed. Therefore, the signal charges Qb1, Qb2, Qb3, . . . , Qb100 are transferred in this order into the binning register 63B.

In the second embodiment, in cases where the signal charges having been transferred from the CCD sensor 10A are subjected to the binning processing, the light receiving pixel a1 is taken as the binning start pixel. Also, in cases where the signal charges having been transferred from the CCD sensor 10B are subjected to the binning processing, the light receiving pixel b1 is taken as the binning start pixel.

By way of example, the signal charges are read from the long CCD sensor unit 50 through the binning processing, in which three pixels are taken as one unit, and the line signal is thereby acquired. In such cases, the line signal acquiring apparatus 100 operates in the manner described below.

Specifically, a signal Z2 for giving an instruction for performing the binning processing, in which the three pixels are taken as one unit, is fed into the binning start position operation device 62. In accordance with the signal Z2, the binning start position operation device 62 reads the information, which represents the total number of the light receiving pixels (in this case, 100 pixels) of each of the CCD sensors 10A and 10B, from the light receiving pixel location memory 61. In accordance with the received information, the binning start position operation device 62 performs the operation for determining a position of the CCD sensor 10B, i.e. the position of the light receiving pixel b1 of the CCD sensor 10B.

More specifically, in cases where the one unit of the binning processing is constituted of the three pixels, a first binning pixel block Sa1 in the CCD sensor 10A is constituted of the light receiving pixels a1, a2, and a3. Also, a last binning pixel block Sa33 in the CCD sensor 10A is constituted of the light receiving pixels a97, a98, and a99. Therefore, as illustrated in FIG. 4, it is found that the light receiving pixel a97 is the pixel, which yields the first signal charge to be transferred into the binning register 63A, in the binning pixel block Sa33. Also, such that the phase, which is determined by the sampling period represented by the intervals of the respective binning pixel blocks of the CCD sensor 10A, the intervals being taken along the linear array direction of the CCD sensors 10A and 10B, and the phase, which is determined by the sampling period represented by the intervals of the respective binning pixel blocks of the CCD sensor 10B, may coincide with each other, the position of the first light receiving pixel of the binning pixel block Sb1 (which is constituted of the light receiving pixels b1, b2, and b3) in the CCD sensor 10B may be determined so as to coincide with the position of the light receiving pixel a97 of the CCD sensor 10A with respect to the linear array direction of the CCD sensors 10A and 10B.

In accordance with the results of the operation described above, an instruction for setting the position of the light receiving pixel b1 of the CCD sensor 10B so as to coincide with the position of the light receiving pixel a97 of the CCD sensor 10A with respect to the linear array direction of the CCD sensors 10A and 10B is given from the binning start position operation device 62 into the controller 43. Through the control made by the controller 43 having received the instruction described above, the linear motor movable section 42 is moved along the linear motor rail 41, and the position of the light receiving pixel b1 of the CCD sensor 10B is set so as to coincide with the position of the light receiving pixel a97 of the CCD sensor 10A with respect to the linear array direction of the CCD sensors 10A and 10B.

After the setting of the position of the CCD sensor 10B described above has been finished, the signal charges, which have been obtained from the photoelectric conversion of the light received with the long CCD sensor unit 50, are read by the line signal acquiring means 60.

From the CCD sensor 10A, firstly, the signal charges Qa1, Qa2, and Qa3, which have been obtained from the photoelectric conversion of the light received with the light receiving pixels a1, a2, and a3 of the binning pixel block Sa1, are transferred into the binning register 63A and subjected to the binning processing. From the binning processing performed on the signal charges Qa1, Qa2, and Qa3, a digital signal component Da1 is formed by the digital signal output circuit 64A. Thereafter, the signal charges, which have been transferred from the light receiving pixels of the binning pixel block Sa2, the signal charges, which have been transferred from the light receiving pixels of the binning pixel block Sa3, and soon, are transferred successively into the binning register 63A and subjected to the binning processing. From the binning processing performed on the signal charges, digital signal components Da2, Da3, Da4, . . . , are formed by the digital signal output circuit 64A. Lastly, a digital signal component Da33 corresponding to the binning pixel block Sa33 is formed by the digital signal output circuit 64A. A signal charge Qa100, which has been transferred from the light receiving pixel a100, is temporarily fed into the binning register 63A and is then erased by the resetting of the binning register 63A.

As for the CCD sensor 10B, signal charges Qb1, Qb2, and Qb3, which have been obtained from the photoelectric conversion of the light received with the light receiving pixels b1, b2, and b3 of the binning pixel block Sb1, are transferred into the binning register 63B and subjected to the binning processing. From the binning processing performed on the signal charges Qb1, Qb2, and Qb3, a digital signal component Db1 is formed by the digital signal output circuit 64B.

Thereafter, the signal charges, which have been transferred from the light receiving pixels of the binning pixel block Sb2, the signal charges, which have been transferred from the light receiving pixels of the binning pixel block Sb3, and so on, are transferred successively into the binning register 63B and subjected to the binning processing. From the binning processing performed on the signal charges, digital signal components Db2, Db3, Db4, . . . are formed by the digital signal output circuit 64B. Lastly, a digital signal component Db33 corresponding to the binning pixel block Sb33, which is constituted of the light receiving pixels b97, b98, and b99, is formed by the digital signal output circuit 64B. Thereafter, a signal charge Qb100, which has been transferred from the light receiving pixel b100, is temporarily fed into the binning register 63B and is then erased by the resetting of the binning register 63B.

Thereafter, the digital signal components Da1, Da2, Da3, . . . , Da33, which have been obtained from the digital signal output circuit 64A, and the digital signal components Db1, Db2, Db3, . . . , Db33, which have been obtained from the digital signal output circuit 64B, are fed into the line signal composing device 65. The values of the digital signal components Da1, Da2, Da3, . . . , Da32 are stored in an output buffer of the line signal composing device 65. The digital signal component Da33 and the digital signal component Db1 are subjected to an arithmetic mean calculation, and the thus calculated arithmetic mean value is taken as the value of the digital signal component in lieu of the values of the digital signal component Da33 and the digital signal component Db1. The digital signal component obtained from the arithmetic mean calculation is stored in the output buffer of the line signal composing device 65. Further, the values of the digital signal components Db2, Db3, . . . , Db33 are stored in the output buffer of the line signal composing device 65.

In the manner described above, the digital signal components Da1, Da2, Da3, . . . , Da32, the digital signal component having been obtained from the arithmetic mean calculation made on the digital signal component Da33 and the digital signal component Db1, and the digital signal components Db2, Db3, . . . , Db33 are stored in the output buffer of the line signal composing device 65. The thus stored digital signal components are fed out as a series of the signal components constituting the line signal, which represents the linear received light information along the two CCD sensors 10A and 10B, from the line signal composing device 65.

In the second embodiment described above, the number of the CCD sensors arrayed linearly is two. However, in cases where at least three CCD sensors are arrayed linearly, the line signal carrying accurate position information is capable of being acquired in the same manner as that described above.

Also, in the first and second embodiments described above, each of the CCD sensors is constituted of the light receiving pixels arrayed linearly in one row. Alternatively, each of the CCD sensors maybe constituted of the light receiving pixels arrayed linearly in at least two rows. In such cases, the same effects as those described above are capable of being obtained.

In the line signal acquiring apparatus in accordance with the present invention, at the time of the reading of the signal charges from the plurality of the light receiving pixels, which constitute each of the CCD sensors, through the binning processing of the signal charges with respect to the linear array direction of the CCD sensors, the binning processing of the signal charges with respect to the linear array direction of the CCD sensors is performed, such that the position of the one unit of the light receiving pixels, which are to be subjected together to the binning processing, at the end region of one of the CCD sensors adjacent to each other and the position of the one unit of the light receiving pixels, which are to be subjected together to the binning processing, at the end region of the other CCD sensor coincide with each other with respect to the linear array direction of the CCD sensors. The technique for performing the binning processing in such a manner is not limited to the techniques employed in the embodiments described above and may be modified in various other ways.

What is claimed is:

1. A method of acquiring a line signal, comprising the steps of:
   i) receiving light with linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the received light being subjected to photoelectric conversion performed by the linear light receiving means, signal charges being obtained from the photoelectric conversion of the received light, and
   ii) reading the signal charges from the linear light receiving means through binning processing of the signal charges with respect to the linear array direction of the charge coupled device sensors, at least one line signal being thereby acquired,
   wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, the binning processing of the signal charges with respect to the linear array direction of the charge coupled device sensors is performed, the binning processing comprising a process for setting such that a position of a first unit of light receiving pixels, which are to be subjected together to the binning processing, at the end region of one of the charge coupled device sensors adjacent to each other and a position of a second unit of light receiving pixels, which are to be subjected together to the binning processing, at the end region of the other charge coupled device sensor coincide with each other with respect to the linear array direction of the charge coupled device sensors.

2. A method as defined in claim 1 wherein the light received with the linear light receiving means is light emitted by a stimulable phosphor sheet, on which a radiation image has been stored, when the stimulable phosphor sheet is exposed to stimulating rays, which cause the stimulable phosphor sheet to emit the light in proportion to an amount of energy stored thereon during its exposure to radiation.

3. The method of claim 1, wherein the binning processing comprises combining outputs signals of a predetermined number of detecting elements of the linearly arrayed charge coupled device sensors as a unit.

4. The method of claim 3, wherein the predetermined number of detecting elements for binning is the same for at least a first and second charged coupled device sensor.

5. The method of claim 3, wherein an overlapped number of detecting elements of a first and second of the plurality of charge coupled device sensors exceeds the predetermined number.

6. The method of claim 5, wherein the overlapped detecting elements which exceed the predetermined number are read out and discarded from at least one of the first and the second of the plurality of charge coupled device sensors and maintained in the other of the plurality of charge coupled device sensors.

7. The method of claim 5, wherein respective values of the predetermined number of detecting element outputs of the first and second charge coupled device sensors are subject to an arithmetic mean calculation to provide effective output signals.

8. An apparatus for acquiring a line signal, comprising:
   i) linear light receiving means comprising a plurality of charge coupled device sensors, which are arrayed linearly and located such that end regions of charge coupled device sensors adjacent to each other overlap one upon the other with respect to a direction intersecting with the linear array direction of the charge coupled device sensors, the linear light receiving means receiving light and performing photoelectric conversion of the received light in order to obtain signal charges, and
   ii) line signal acquiring means for reading the signal charges from the linear light receiving means through binning processing of the signal charges with respect to the linear array direction of the charge coupled device sensors in order to acquire at least one line signal,
   wherein, at the time of the reading of the signal charges from a plurality of light receiving pixels, which constitute each of the charge coupled device sensors of the linear light receiving means, through the binning processing of the signal charges with respect to the linear array direction of the charge coupled device sensors, the line signal acquiring means performs the binning processing of the signal charges with respect to the linear array direction of the charge coupled device sensors, the binning processing comprising a process for setting such that a position of a first unit of light receiving pixels, which are to be subjected together to the binning processing, at the end region of one of the charge coupled device sensors adjacent to each other and a position of a second unit of light receiving pixels, which are to be subjected together to the binning processing, at the end region of the other charge coupled device sensor coincide with each other with respect to the linear array direction of the charge coupled device sensors.

9. An apparatus as defined in claim 8 wherein the light received with the linear light receiving means is light emitted by a stimulable phosphor sheet, on which a radiation image has been stored, when the stimulable phosphor sheet is exposed to stimulating rays, which cause the stimulable phosphor sheet to emit the light in proportion to an amount of energy stored thereon during its exposure to radiation.

10. An apparatus for acquiring a line signal, the apparatus comprising:

a first CCD sensor including a plurality of light receiving pixels aligned in a first direction;

a second CCD sensor including a plurality of light receiving pixels aligned in the first direction, the second CCD sensor being arranged next to the first CCD sensor in the first direction, the second CCD sensor further including an end overlapping with an end of the first CCD sensor in the first direction; and a binning start pixel operator for determining a binning start pixel of pixels at the end of the first CCD sensor, the end overlapping with the second CCD sensor, using the number of the plurality of light receiving pixels included in the first CCD sensor and the number of binning pixels, and for determining a light receiving pixel on the second CCD sensor, wherein the number of binning pixels is a predetermined number, and wherein the light receiving pixel on the second CCD sensor is arranged at the same position as that of the determined binning start pixel along the first direction, wherein an overlapped number of detecting elements of a first and second of the plurality of charge coupled device sensors exceeds the predetermined number.

11. A radiographic image readout apparatus comprising: an apparatus for acquiring a line signal as defined in claim 10.

* * * * *